United States Patent
Kobayashi et al.

[11] Patent Number: 6,162,892
[45] Date of Patent: Dec. 19, 2000

[54] GAS BARRIER COMPOSITION AND MOLDED RESIN

[75] Inventors: Hideki Kobayashi; Masayuki Hayashi, both of Chiba Prefecture, Japan

[73] Assignee: Dow Corning Toray Silicone Co., Ltd., Tokyo, Japan

[21] Appl. No.: 09/407,499

[22] Filed: Sep. 28, 1999

[30] Foreign Application Priority Data

Sep. 30, 1998 [JP] Japan ................... 10-294579

[51] Int. Cl.$^7$ ................ C08G 69/00; C08G 73/00; C08G 8/00; C08G 12/00; C08G 14/00

[52] U.S. Cl. ................ 528/310; 528/10; 528/26; 528/38; 528/44; 528/60; 528/86; 528/87; 528/125; 528/220; 528/229; 528/403; 428/411.1

[58] Field of Search ................ 528/10, 38, 60, 528/26, 44, 220, 229, 86, 87, 125, 403, 310; 428/441.1

[56] References Cited

FOREIGN PATENT DOCUMENTS

| | | |
|---|---|---|
| WO 91/02100 | 2/1991 | European Pat. Off. . |
| 0798590 A2 | 10/1997 | European Pat. Off. . |
| 0829507 A2 | 3/1998 | European Pat. Off. . |
| 2-286331 | 11/1990 | Japan . |
| 7-18221 | 1/1995 | Japan . |

*Primary Examiner*—P. Hampton-Hightower
*Attorney, Agent, or Firm*—Alex Weitz

[57] ABSTRACT

The invention relates to a gas barrier composition as well as to composite structures having at least one surface of a molded resin coated with the composition, said composition comprising:

(A) an alkoxysilyl functional polyamine compound, or a hydrolyzate thereof, said polyamine compound having three or more amine groups, at least one nitrogen atom of said amine groups being bonded to a hydrogen atom and at least one nitrogen of said amine groups being bonded to an alkoxysilyl group expressed by the formula $$-W-SiR^2{}_{3-f}(OR^1)_f$$

wherein $R^1$ is an alkyl group having 1 to 6 carbon atoms, $R^2$ is a monovalent hydrocarbon group having 1 to 10 carbon atoms, W is a divalent hydrocarbon group having 2 to 10 carbon atoms, and f is an integer having a value of 1 to 3; and (B) an organic compound which is free of acrylic groups, said organic compound having an aromatic ring or an alicyclic hydrocarbon group and having per molecule at least two functional groups that are reactive with the amine groups, the alkoxy groups, or both, of component A.

20 Claims, No Drawings

GAS BARRIER COMPOSITION AND MOLDED RESIN

FIELD OF THE INVENTION

The present invention relates to a gas barrier composition and a molded resin, and more particularly relates to a gas barrier composition that can be molded as a thin film having superior transparency, adhesion, and gas barrier performance. The invention further relates to a molded resin having a thin film layer of this composition on its surface or between layers.

BACKGROUND OF THE INVENTION

There is increasing demand in fields such as packaging materials for a gas barrier material with low permeability to oxygen and moisture. Gas barrier plastic films known in the art include (1) those in which a molded article is produced from a gas-impermeable macromolecular material such as an ethylene-vinyl alcohol copolymer, a vinylidene chloride copolymer, or a poly-m-xylylene adipamide; (2) those in which one of these gas-impermeable materials is used to laminate or coat another material; (3) those in which an aluminum foil is laminated with a film-forming material; and (4) those in which a metal oxide is vapor deposited.

However, a problem with the ethylene-vinyl alcohol copolymer or poly-m-xylylene adipamide mentioned in (1) is that these materials are highly hygroscopic, and their gas barrier performance decreases as moisture is absorbed, while a problem with a vinylidene chloride copolymer is the pollution caused by the chlorine atoms. The aluminum foil-laminated film of (3) is not transparent, which is a problem in that the contents of a package cannot be viewed from the outside. A problem with the metal-deposited film of (4) is that it is prone to cracking, which can lead to impaired gas barrier performance during packaging.

In an effort to solve these problems, there has been research into silicon oxide thin films obtained by the hydrolysis of a tetraalkoxysilane. A problem with this, however, is that a tetraalkoxysilane hydrolytic condensation reaction results in a large volumetric shrinkage during condensation, which makes the material susceptible to cracks and pinholes. Another area that has been investigated is the suppression of cracks and pinholes by subjecting an alkyltrialkoxysilane to hydrolytic condensation by itself or to co-hydrolytic condensation with a tetraalkoxysilane, but because an alkyltrialkoxysilane has low reactivity, a drawback is that a large amount of monomer remains unreacted. A further drawback is that uniform co-hydrolytic condensation is next to impossible when a tetraalkoxysilane is also used.

In Japanese Laid-Open Patent Application 2-286331, for example, it has been proposed that an alkoxysilane be subjected to hydrolytic condensation to cover a plastic film, but a drawback to this method is that the flexibility of the film is markedly compromised because only the alkoxysilane component coated the film. Also, a composition composed of a monoaminoalkyl group- or diaminoalkyl group-containing alkoxysilane and a compound having an aromatic ring or a hydrogenated ring has been proposed in Japanese Laid-Open Patent Application 7-18221, but the oxygen barrier performance of this composition cannot be considered satisfactory, and needs to be improved further.

SUMMARY OF THE INVENTION

It is an object of the present invention to provide a gas barrier composition that can be formed into a thin film having superior transparency, adhesion, and gas barrier performance. Another object of the present invention is to provide a molded resin having a thin film layer of the above composition on its surface or between layers thereof.

The present invention thus relates to a gas barrier composition comprising (A) an alkoxysilyl functional polyamine compound, or hydrolyzate thereof, with three or more nitrogen atoms and having in each molecule at least one hydrogen atom bonded to a nitrogen atom and at least one alkoxysilyl group expressed by the formula $-W-SiR^2_{3-f}(OR^1)_f$ (where $R^1$ is an alkyl group with 1 to 6 carbon atoms, $R^2$ is a monovalent hydrocarbon group with 1 to 10 carbon atoms, W is a divalent hydrocarbon group with 2 to 10 carbon atoms, and f is an integer of 1 to 3) bonded to a nitrogen atom, and (B) an organic compound free of acrylic groups and containing an aromatic ring or an alicyclic hydrocarbon group and having per molecule at least two functional groups that are reactive with the amine groups and/or silicon atom-bonded alkoxy groups of component A. The invention further relates to a molded resin having a thin film layer of the above-mentioned gas barrier composition coated on at least one side thereof. The invention also relates to a composite having a thin film layer of the above-mentioned gas barrier composition in between molded resins.

DETAILED DESCRIPTION OF THE INVENTION

Component A used in the composition of the present invention is an alkoxysilyl functional polyamine compound, or hydrolyzate thereof, having three or more nitrogen atoms and having in each molecule at least one hydrogen atom bonded to a nitrogen atom and at least one alkoxysilyl group expressed by the formula $-W-SiR^2_{3-f}(OR^1)_f$. In the above formula, $R^1$ is an alkyl group with 1 to 6 carbon atoms, examples of which include the methyl group, ethyl group, propyl group, butyl group, pentyl group, and hexyl group. $R^2$ is a monovalent hydrocarbon group with 1 to 10 carbon atoms, examples of which include the methyl group, ethyl group, propyl group, butyl group, pentyl group, hexyl group, heptyl group, octyl group, nonyl group, decyl group, or other alkyl group; and the phenyl group or other aryl group. W is a divalent hydrocarbon group with 2 to 10 carbon atoms, examples of which include the ethylene group, methylethylene group, ethylethylene group, propylethylene group, butylethylene group, propylene group, butylene group, 1-methylpropylene group, pentylene group, hexylene group, heptylene group, octylene group, nonylene group, and decylene group. The subscript f is an integer having a value of 1 to 3, preferably 2 or 3. This polyamine compound has a structure in which nitrogen atoms are bonded via divalent hydrocarbon groups, with the proviso that at least one hydrogen atom and at least one alkoxysilyl group must be bonded to nitrogen atoms. It is preferable that at least 50% of the groups bonded to the nitrogen atoms are hydrogen atoms. It is also preferable for this polyamine compound not to contain an aromatic ring, and for the average molecular weight thereof to be at least 260.

The polyamine compounds expressed by the following general formulas are typical examples of component A.

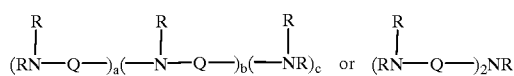

In the above formulas, R is a hydrogen atom or a monovalent organic group. Examples of monovalent organic groups include the methyl group, ethyl group, propyl group, butyl group, pentyl group, hexyl group, heptyl group, octyl group, nonyl group, decyl group, and other alkyl groups; the phenyl group and other aryl groups; and other such unsubstituted hydrocarbon groups with 1 to 10 carbon atoms; substituted monovalent hydrocarbon groups in which the hydrogen atoms of the above-mentioned alkyl groups have been substituted with hydroxyl groups or halogen atoms; alkoxysilyl groups expressed by the formula —W—SiR$^2_{3-f}$(OR$^1$)$_f$(where R$^1$, R$^2$, W, and f are defined the same as above); and amino groups expressed by the following formula.

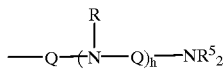

Here, at least one of the R groups is a hydrogen atom, and at least one R group is one of the above-mentioned alkoxysilyl groups. It is preferable for at least 50 mole % of these R groups to be hydrogen atoms. In the above-mentioned amino group, R$^5$ is a hydrogen atom, a substituted or unsubstituted monovalent hydrocarbon group with 1 to 10 carbon atoms, or one of the alkoxysilyl groups expressed by the above formula. Examples of substituted or unsubstituted monovalent hydrocarbon groups are the same groups listed above. In the above formula, h is an integer greater or equal to than 0. In the above formulas Q is a divalent hydrocarbon group with 2 to 6 carbon atoms, examples of which include the ethylene group, methylethylene group, ethylethylene group, propylethylene group, butylethylene group, propylene group, butylene group, 1-methylpropylene group, pentylene group, and hexylene group and a, b, and c are integers greater than or equal to 1.

The following are examples of the polyamine compound of component A. In the formulas, Me is a methyl group, and Et is an ethyl group.

NH$_2$—C$_2$H$_4$—NH—C$_2$H$_4$—NH—C$_3$H$_6$Si(OMe)$_3$
(NH$_2$—C$_2$H$_4$—)$_2$N—C$_3$H$_6$Si(OMe)$_3$
NH$_2$—C$_2$H$_4$—NH—C$_2$H$_4$—NH—C$_3$H$_6$Si(OMe)$_2$
(NH$_2$—C$_2$H$_4$—)$_2$N—C$_3$H$_6$Si(OMe)$_2$
NH$_2$—C$_2$H$_4$—NH—C$_2$H$_4$—NH—C$_3$H$_6$Si(OEt)$_3$
(NH$_2$—C$_2$H$_4$—)$_2$N—C$_3$H$_6$Si(OEt)$_3$

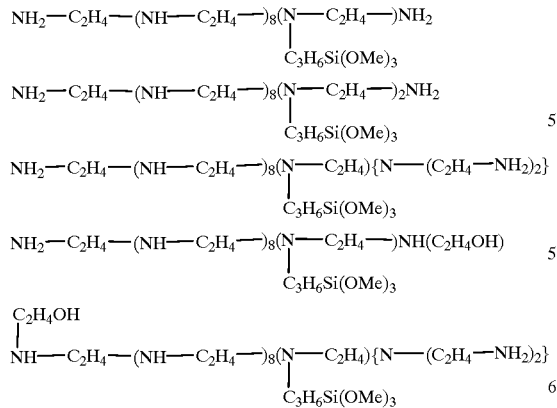

The polyamine compound of component A can be manufactured, for example, by allowing a corresponding polyamine to react with an alkoxysilane containing chloropropyl groups or other such halogenated alkyl groups, such as the alkoxysilanes expressed by the following formula.

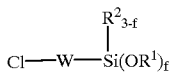

Wherein R$^1$, R$^2$, W, and f are defined as above. The by-product hydrochloric acid of this reaction may be dissolved in the system as a salt of the polyamine compound, but it may also be neutralized with sodium methylate (used in an amount close to an equivalent), or the by-product sodium chloride may be filtered off. Neutralization with sodium methylate, however, will result in methanol remaining in the system. Accordingly, the by-product sodium chloride can be filtered off by neutralizing the system with sodium hydroxide in an amount close to an equivalent. By-product water will result in this case, so some of the alkoxysilyl groups in the obtained polyamine compound will be hydrolyzed into silanol groups, and these will produce siloxane bonds, which means that the polyamine compound of component A will end up containing a partial hydrolyzate. In addition, the polyamine compound of component A may be subjected to a small amount of hydrolysis so that some of the alkoxysilyl groups are hydrolyzed, or an equivalent or more of water may be added so that the majority of the alkoxysilyl groups are hydrolyzed.

It is preferable for the hydrolyzate of the polyamine compound of component A to be a partial co-hydrolyzate with an alkoxysilane of the formula R$^3_{4-g}$Si(OR$^4$)$_g$. In this formula, R$^3$ is a substituted or unsubstituted monovalent hydrocarbon group with 1 to 20 carbon atoms. Examples of unsubstituted monovalent hydrocarbon groups include the alkyl groups and aryl groups listed above for R$^2$, as well as the vinyl group, allyl group, 5-hexenyl group, and other such alkenyl groups. Examples of substituted monovalent hydrocarbon groups include monovalent hydrocarbon groups substituted with halogen atoms, as well as the 3-aminopropyl group, N-β-(aminoethyl)-γ-aminopropyl group, γ-glycidoxypropyl group, and γ-mercaptopropyl group. R$^4$ is an alkyl group with 1 to 4 carbon atoms, examples of which include the same groups as those listed above for R$^1$ and g is an integer from 1 to 4. Specific examples of this alkoxysilane include tetramethoxysilane, tetraethoxysilane, tetraisopropoxysilane, tetrabutoxysilane, methyltrimethoxysilane, methyltriethoxysilane, methyltriisopropoxysilane, methyltributoxysilane, ethyltrimethoxysilane, ethyltriethoxysilane, ethyltriisopropoxysilane, ethyltributoxysilane, dimethyldimethoxysilane, dimethyldiethoxysilane, dimethyldiisopropoxysilane, dimethyldibutoxysilane, diethyldimethoxysilane, diethyldiethoxysilane, diethyldiisopropoxysilane, diethyldibutoxysilane, vinyltrimethoxysilane, vinyltriethoxysilane, γ-glycidoxypropyltrimethoxysilane, γ-glycidoxypropyltriethoxysilane, γ-methacryloxypropyltrimethoxysilane, γ-chloropropyltrimethoxysilane, γ-mercaptopropyltrimethoxysilane, and the alkoxysilanes expressed by the following formulas.

C$_4$F$_9$C$_2$H$_4$Si(OCH$_3$)$_3$

C$_6$F$_{13}$C$_3$H$_6$Si(CH$_3$)(OCH$_3$)$_2$

Using one or more of these compounds, a partial co-hydrolytic condensate is produced by subjecting the above-mentioned polyamine compound to hydrolytic condensation. Here, a small amount of an alkoxysilane may be added in order to hydrolyze some of the alkoxysilyl groups in component A, or an equivalent or more of an alkoxysilane may be added in order to hydrolyze the majority of the alkoxysilyl groups.

The organic compound of component B is a compound having an aromatic ring or an alicyclic hydrocarbon group and having per molecule at least two functional groups that are reactive with the amine groups and/or silicon atom-bonded alkoxy groups in component A. Examples of reactive functional groups include isocyanate groups, epoxy groups, carboxyl groups, hydroxyl groups, oxazoline groups, and alkoxysilyl groups. These functional groups may be the same or different. Functional groups that will react with the amino groups in component A are particularly favorable, and from the standpoint of this reactivity, it is preferable for them to be epoxy groups or isocyanate groups. If the functional groups in component B are epoxy groups or isocyanate groups, it is preferable for the hydrolytic condensation of component A to be conducted after these groups have reacted with the amino groups in component A in order to prevent the epoxy groups or isocyanate groups from undergoing a hydrolysis reaction or reacting with the solvent. There are no particular restrictions on the amount in which component B is used, but an amount between 1 and 200 weight parts per 100 weight parts of the polyamine compound of component A is preferable, and a range of 4 to 100 weight parts is even better.

Specific examples of component B include tolylene diisocyanate, 1,4-diphenylmethane diisocyanate, 1,5-naphthalene diisocyanate, triphenylmethane triisocyanate, tolidine diisocyanate, xylylene diisocyanate, dicyclohexylmethane diisocyanate, and other such isocyanates; bisphenol A diglycidyl ether, resorcinol diglycidyl ether, hydroquinone diglycidyl ether, o-phthalic acid diglycidyl ester, tetraphthalic acid diglycidyl ester, bisphenol S diglycidyl ether, bisphenol F diglycidyl ether, and compounds expressed by the following formulas.

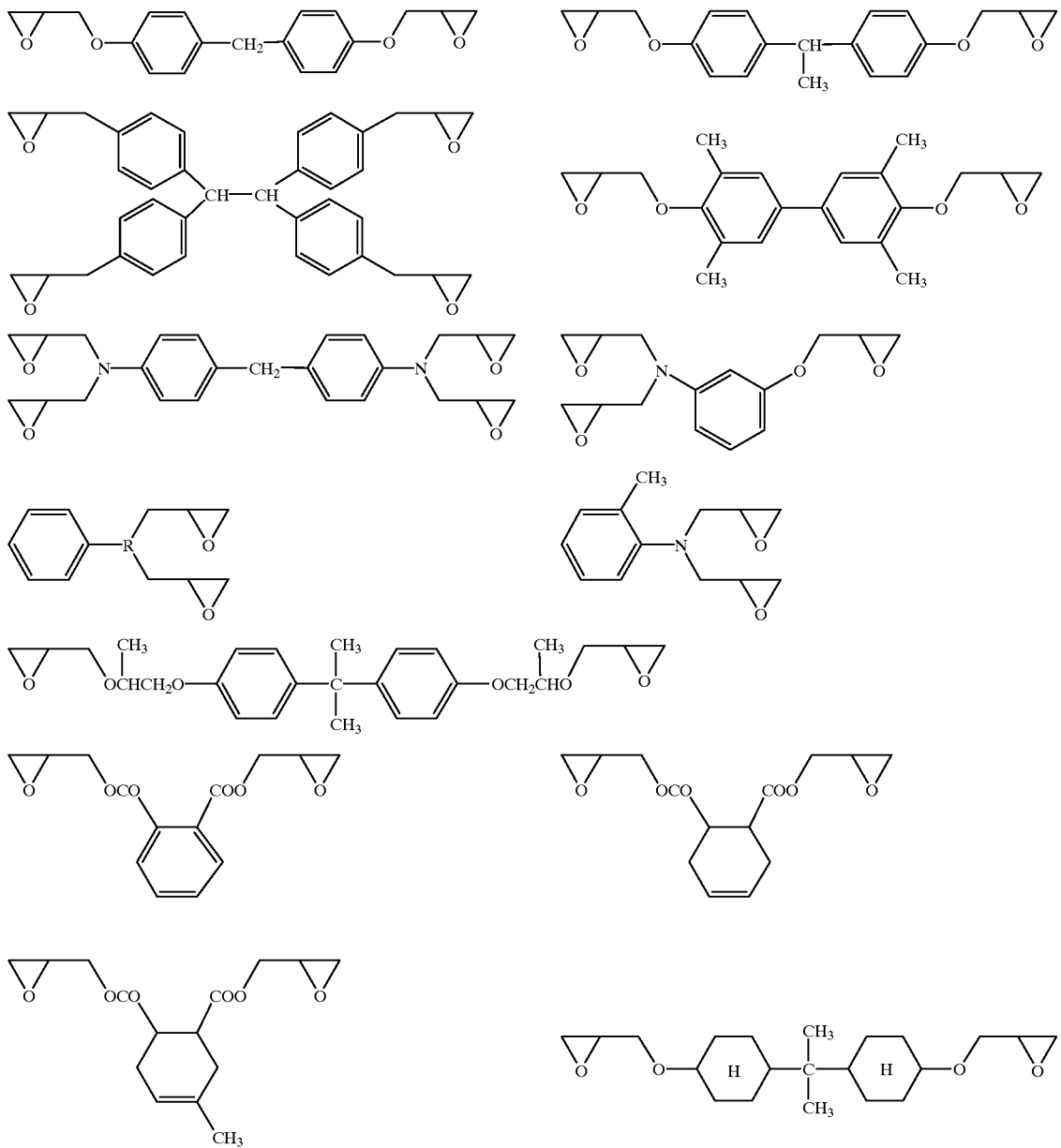

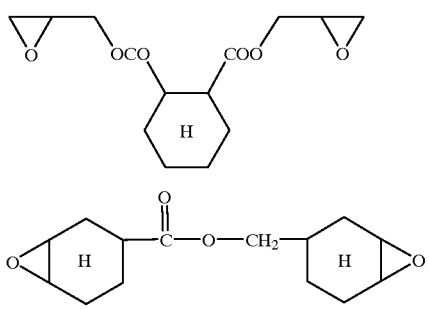
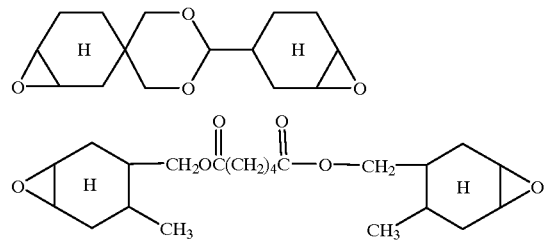

One or more of these compounds can be used, but bisphenol A diglycidyl ether is particularly preferred. Oligomers of the above-mentioned compounds are also encompassed by component B, examples of which include an oligomer of bisphenol A diglycidyl ether expressed by the following formula, wherein x is an integer greater than or equal to 0.

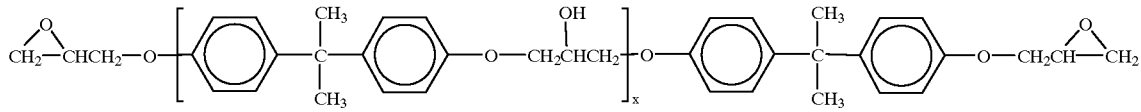

The composition of the present invention may be a mixture of the above-mentioned components A and B, or it may be a reaction product of these. Also, the composition of the present invention may be diluted with an organic solvent. There are no particular restrictions on the solvent that is used, as long as it will dissolve the polyamine compound of component A and the organic compound of component B, but specific examples include methanol, ethanol, isopropanol, butanol, pentanol, ethylene glycol, diethylene glycol, triethylene glycol, ethylene glycol monomethyl ether, diethylene glycol monomethyl ether, triethylene glycol monomethyl ether, and other such alcohols; acetone, methyl ethyl ketone, methyl isobutyl ketone, cyclohexanone, and other such ketones; toluene, benzene, xylene, and other such aromatic hydrocarbons; hexane, heptane, octane, and other such hydrocarbons; methyl acetate, ethyl acetate, propyl acetate, butyl acetate, and other such acetates; and ethylphenol ether, propyl ether, and tetrahydrofuran. These may be used singly or as a mixture of two or more types. Of these, an alcohol is particularly favorable. These solvents can be used to conduct the hydrolytic condensation reaction of the above-mentioned polyamine compound and alkoxysilane.

To the extent that the effect of the present invention is not compromised, various inorganic and organic additives, such as a curing catalyst, wettability improver, plasticizer, antifoaming agent, or thickener, can be added to the gas barrier composition of the present invention.

The molded resin composite of the present invention has a thin film layer of the above described gas barrier composition coated on at least one side of a molded resin, or has a laminate structure having a thin film layer of the gas barrier composition of the present invention between molded resins. In other words, this is a laminate structure in which another molded resin is laminated to the surface of a molded resin having a thin film layer of the gas barrier composition of the present invention.

There are no particular restrictions on the resin that serves as the base material of the molded resin of the present invention, but examples include polyethylene, polypropylene, and other polyolefin resins; polyethylene terephthalate (PET), polyethylene isophthalate, polyethylene-2,6-naphthalate, polybutylene terephthalate, copolymers of these, and other polyester resins; polyamide resins; polystyrene, poly(meth)acrylic esters, polyacrylonitrile, polyvinyl acetate, polycarbonate, cellophane, polyimide, polyether imide, polyphenylenesulfone, polysulfone, polyether ketone, ionomer resins, fluororesins, and other thermoplastic resins; and melamine resins, polyurethane resins, epoxy resins, phenol resins, unsaturated polyester resins, alkyd resins, urea resins, silicone resins, and other thermosetting resins.

Examples of the shape of the molded resin include a film, a sheet, and a bottle, and the shape can be selected as dictated by the intended application. There are no particular restrictions on the thickness of the molded resin, but in the case of a film or sheet, the thickness is usually between 5 and 100 $\mu$m. Of the above resins, it is particularly favorable for the molded resin used in the present invention to be a thermoplastic film because of its ease of working.

To manufacture a molded resin having a thin film layer of a gas barrier composition on at least one side of a molded resin, at least one side of a molded resin is coated with the above-mentioned gas barrier composition. While there are no particular restrictions on the method for accomplishing this, examples include roll coating, dip coating, bar coating, nozzle coating, and combinations of these methods. Prior to this coating, the molded resin can also be subjected to a surface activation treatment such as a corona treatment, or to a known anchoring treatment with a urethane resin or the like. After this coating, the thin film is cured and dried. The gas barrier composition of the present invention can be cured and dried at ambient temperature, but it may also be heated at a temperature below the degradation temperature of the molded resin to cure and dry the composition faster. It is preferable for the thickness of the thin film after drying of the gas barrier composition of the present invention to be between 0.001 and 20 $\mu$m, and a range of 0.01 to 10 $\mu$m is even better. This is because the thin film will not be uniform and will be prone to the generation of pinholes if it is thinner than 0.001 $\mu$m, and cracks will tend to form in the film if it is thicker than 20 $\mu$m.

Examples of the molded resin having a laminate structure of the present invention include one in which a molded resin such as a thermoplastic film is coated with the gas barrier composition of the present invention to form a gas barrier thin film layer, over which the same or a different type of thermoplastic film is applied using an ordinary laminator, and this product is heated and pressed to laminate the layers. Alternatively, a molded resin such as a thermoplastic film may be coated with the gas barrier composition of the present invention, and this coating thoroughly heated and dried to form a thin film layer, after which the same or a different type of thermoplastic film is applied using a known adhesive agent to laminate the layers.

WORKING EXAMPLES

The present invention will now be described in specific terms through working examples, but the present invention is not limited to or by these examples. All "parts" refer to weight parts. Oxygen permeability was measured at 25° C. using an oxygen permeability tester made by Mokon (trade name: Ox-Tran 2/20 MH).

Synthesis Example 1

Polyethyleneimide (40.5 parts )with a molecular weight of 1000 (trade name: Epomine SP110, made by Nippon Shokubai) was added to 50 parts isopropyl alcohol, and these components were heated to between 80 and 90° C. 3-chloropropyltrimethoxysilane (10.2 parts) was then added, and the system was heated for 2 hours at between 80 and 90° C. After this heating, the reaction solution was neutralized with sodium methoxide and then filtered, which yielded an alkoxysilyl functional polyethyleneimine compound in which trimethoxysilyipropyl groups were grafted in an amount of 17 wt %.

Working Example 1

Fifty grams of the alkoxysilyl functional polyethyleneimine compound obtained in Synthesis Example 1, 30 g of isopropyl alcohol, and 15 g of bisphenol A diglycidyl ether were put in a flask equipped with an agitator, a thermometer, and a condenser, and the contents were mixed for 2 hours at 30° C. Sixteen grams of water and another 180 g of isopropyl alcohol were added to this and mixed, which yielded gas barrier composition A.

Using a bar coater, the gas barrier composition A thus obtained was applied as a coating 1.5 $\mu$m thick over a PET film (12 $\mu$m thick), and this coating was dried for 1 minute at 70° C., This film was laminated with a polyethylene film (LLDPE) 50 $\mu$m thick using a laminator made by Tokyo Laminex (trade name: DX-350) with the roll temperature set at 80° C., thereby producing a laminate film. The oxygen permeability at 0% RH of the film thus obtained was 4 cc/m$^2$·24 hrs·atm.

Working Example 2

Fifty grams of a mixture (4:1) of an alkoxysilyl functional polyamine compound (B1) expressed by the formula NH$_2$C$_2$NHC$_2$H$_4$NH—C$_3$H$_6$Si(OMe)$_3$ and an alkoxysilyl functional polyamine compound (B2) expressed by the formula (NH$_2$C$_2$H$_4$)$_2$N—C$_3$H$_6$Si(OMe)$_3$, 30 g of isopropyl alcohol, and 15 g of bisphenol A diglycidyl ether were put in a flask equipped with an agitator, a thermometer, and a condenser, and the contents were mixed for 2 hours at 30° C. Fifteen grams of water and another 180 g of isopropyl alcohol were added to this and mixed, which yielded gas barrier composition B.

The gas barrier composition B thus obtained was applied as a 1.5 $\mu$m thick coating by bar coater over a PET film 12 $\mu$m thick, and this coating was dried for 2 minutes at 80° C. to produce a coated film. The transparency of the film thus obtained was compared visually with that of an untreated PET film, and was found to be virtually the same, with both being good. This film did not crack when bent at 180°, thus exhibiting good flexibility.

Working Example 3

Fifty grams of the alkoxysilyl functional polyethyleneimine compound obtained in Synthesis Example 1, 5 g of tetraethoxysilane, 30 g of isopropyl alcohol, and 15 g of bisphenol A diglycidyl ether were put in a flask equipped with an agitator, a thermometer, and a condenser, and the contents were mixed for 2 hours at 30° C. Sixteen grams of water and another 180 g of isopropyl alcohol were added to this and mixed, which yielded gas barrier composition C.

Using the gas barrier composition C obtained in this manner, a laminate film was produced in the same manner as in Working Example 1. The oxygen permeability at 0% RH of the film thus obtained was 5 cc/m$^2$·24 hrs·atm.

Comparative Example 1

Fifty grams of 3-aminopropyltriethoxysilane, 30 g of isopropyl alcohol, and 15 g of bisphenol A diglycidyl ether were put in a flask equipped with an agitator, a thermometer, and a condenser, and the contents were mixed for 3 hours at 70° C. The system was cooled, after which 15 g of water and another 180 g of isopropyl alcohol were added to this and mixed, which yielded a gas barrier composition. Using the gas barrier composition thus obtained, a laminate film was produced in the same manner as in Working Example 1. The oxygen permeability at 0% RH was measured and found to be 60 cc/m$^2$·24 hrs·atm.

That which is claimed is:

1. A gas barrier composition comprising: (A) an alkoxysilyl functional polyamine compound, or a hydrolyzate thereof, said polyamine compound having three or more amine groups, at least one nitrogen atom of said amine groups being bonded to a hydrogen atom and at least one nitrogen of said amine groups being bonded to an alkoxysilyl group expressed by the formula

wherein R$^1$ is an alkyl group having 1 to 6 carbon atoms, R$^2$ is a monovalent hydrocarbon group having 1 to 10 carbon atoms, W is a divalent hydrocarbon group having 2 to 10 carbon atoms, and f is an integer having a value of 1 to 3; and (B) an organic compound which is free of acrylic groups, said organic compound having an aromatic ring or an alicyclic hydrocarbon group and having per molecule at least two functional groups that are reactive with the amine groups, the alkoxy groups, or both, of component A.

2. A gas barrier composition according to claim 1, wherein said alkoxysilyl functional polyamine compound (A) is expressed by a formula selected from

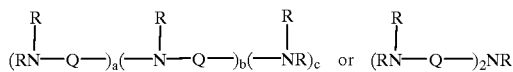

wherein R is selected from hydrogen or a monovalent organic group, Q is a divalent hydrocarbon group having 2 to 6 carbon atoms, and a, b, and c are integers, each having a value of at least 1, with the proviso that at least one R group is hydrogen and at least one R group is an alkoxysilyl group expressed by the formula

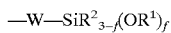

wherein R$^1$ is an alkyl group having 2 to 6 carbon atoms, R$^2$ is a monovalent hydrocarbon group having 1 to 10 carbon atoms, W is a divalent hydrocarbon group having 2 to 10 carbon atoms, and f is an integer having a value of 1 to 3.

3. A gas barrier composition according to claim 1, wherein the hydrolyzate of component A is a co-hydrolyzate with an alkoxysilane expressed by the formula $R^3_{4-g}Si(OR^4)_g$ in which $R^3$ is a substituted or unsubstituted monovalent hydrocarbon group having 1 to 20 carbon atoms, $R^4$ is an alkyl group with 1 to 6 carbon atoms, and g is an integer having a value of 1 to 4.

4. A gas barrier composition according to claim 2, wherein the hydrolyzate of component A is a co-hydrolyzate with an alkoxysilane expressed by the formula $R^3_{4-g}Si(OR^4)_g$ in which $R^3$ is a substituted or unsubstituted monovalent hydrocarbon group having 1 to 20 carbon atoms, $R^4$ is an alkyl group with 1 to 6 carbon atoms, and g is an integer having a value of 1 to 4.

5. A gas barrier composition according to claim 1, wherein said compound B has at least two groups selected from epoxy groups or isocyanate groups per molecule.

6. A gas barrier composition according to claim 2, wherein said compound B has at least two groups selected from epoxy groups or isocyanate groups per molecule.

7. A gas barrier composition according to claim 3, wherein said compound B has at least two groups selected from epoxy groups or isocyanate groups per molecule.

8. A gas barrier composition according to claim 4, wherein said compound B has at least two groups selected from epoxy groups or isocyanate groups per molecule.

9. A molded resin having a coating of the gas barrier composition according to claim 1 coated on at least one side thereof.

10. A molded resin having a coating of the gas barrier composition according to claim 2 coated on at least one side thereof.

11. A molded resin having a coating of the gas barrier composition according to claim 3 coated on at least one side thereof.

12. A molded resin having a coating of the gas barrier composition according to claim 4 coated on at least one side thereof.

13. A molded resin having a coating of the gas barrier composition according to claim 5 coated on at least one side thereof.

14. A molded resin having a coating of the gas barrier composition according to claim 6 coated on at least one side thereof.

15. A composite having a layer of the gas barrier composition according to claim 1 laminated between molded resins.

16. A composite having a layer of the gas barrier composition according to claim 2 laminated between molded resins.

17. A composite having a layer of the gas barrier composition according to claim 3 laminated between molded resins.

18. A composite having a layer of the gas barrier composition according to claim 4 laminated between molded resins.

19. A composite having a layer of the gas barrier composition according to claim 5 laminated between molded resins.

20. A composite having a layer of the gas barrier composition according to claim 6 laminated between molded resins.

* * * * *